No. 12,700. REISSUED OCT. 1, 1907.

A. ZEHDEN.

ELECTRIC TRACTION APPARATUS.

APPLICATION FILED AUG. 21, 1907.

4 SHEETS—SHEET 1.

Witnesses.
E. B. Gilchrist
H. B. Sullivan.

Inventor:
Alfred Zehden
by
Thurston & Woodward
Attorneys

No. 12,700. REISSUED OCT. 1, 1907.

A. ZEHDEN.

ELECTRIC TRACTION APPARATUS.

APPLICATION FILED AUG. 21, 1907.

4 SHEETS—SHEET 2.

Witnesses,
E. B. Gilchrist
H. R. Sullivan.

Inventor
Alfred Zehden
by
Thurston Woodward
Attorney.

No. 12,700. REISSUED OCT. 1, 1907.

A. ZEHDEN.

ELECTRIC TRACTION APPARATUS.

APPLICATION FILED AUG. 21, 1907.

4 SHEETS—SHEET 3.

Witnesses.
E. B. Gilchrist
H. R. Sullivan.

Inventor
Alfred Zehden
by
Thurston & Woodward
Attorneys

No. 12,700. REISSUED OCT. 1, 1907.

A. ZEHDEN.

ELECTRIC TRACTION APPARATUS.

APPLICATION FILED AUG. 21, 1907.

4 SHEETS—SHEET 4.

Witnesses.
E. B. Gilchrist
H. R. Sullivan.

Inventor.
Alfred Zehden
by
Thurston & Woodward
Attorneys.

UNITED STATES PATENT OFFICE.

ALFRED ZEHDEN, OF FRANKFORT-ON-THE-MAIN, GERMANY, ASSIGNOR TO J. M. WOODWARD, OF CLEVELAND, OHIO.

ELECTRIC TRACTION APPARATUS.

No. 12,700. Specification of Reissued Letters Patent. Reissued Oct. 1, 1907.

Original No. 782,312, dated February 14, 1905, Serial No. 112,716. Application for reissue filed August 21, 1907. Serial No. 389,589.

*To all whom it may concern:*

Be it known that I, ALFRED ZEHDEN, engineer, a subject of the Emperor of Germany, and a resident of Frankfort-on-the-Main, Germany, have invented certain new and useful Improvements in Electric Traction Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to the fact that instead of a rotary field such as is common in polyphase apparatus for translating electrical into mechanical energy and vice versa, a traveling field *i. e.*, a field moving on a line other than a circular line—would result if, as one might imagine, a rotary field motor were opened out and were made infinitely large, and in accordance therewith any prejudicial one-sided attraction that otherwise might occur between the inducing and the induced parts is obviated or the attraction is turned to account by an appropriate arrangement of the said parts, which avoids their too close juxtaposition so that actual mechanical contact is avoided and starting is rendered easy without too large a current, even should a so-called "short circuit armature" be used.

Figure 1:
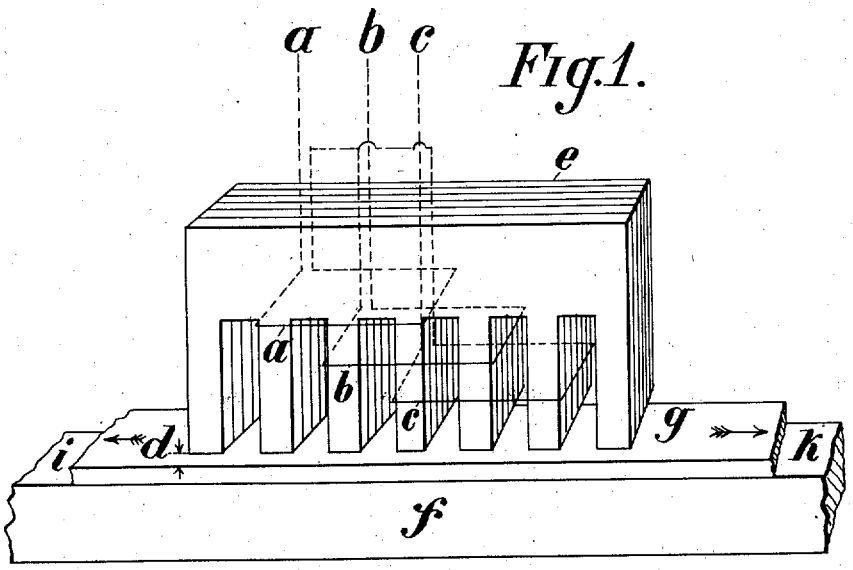
Figure 2:
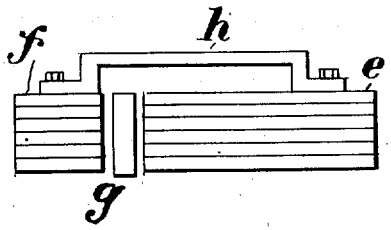
Figure 3:
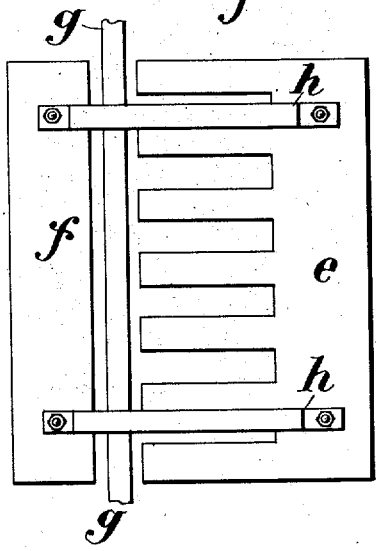
Figure 5:
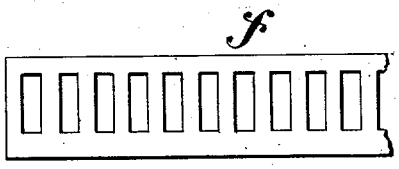
Figure 4:
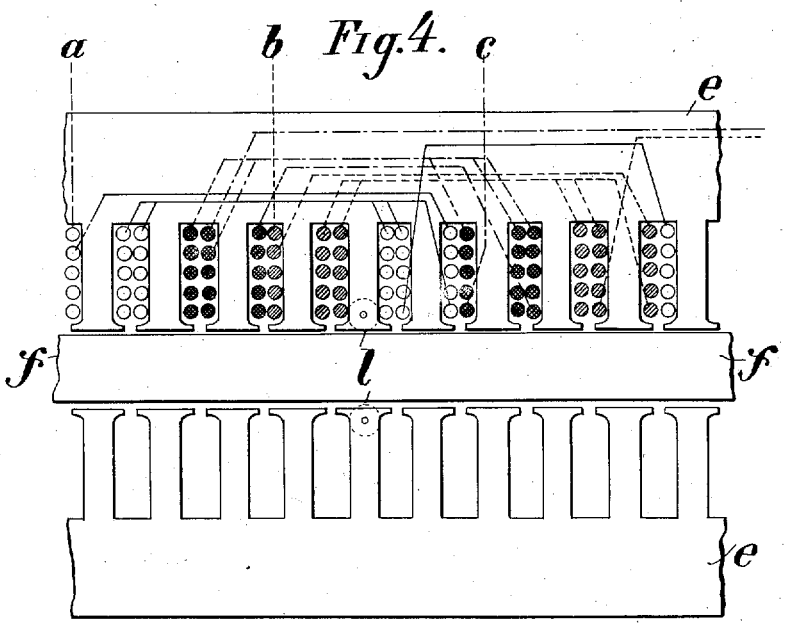
Figure 6:
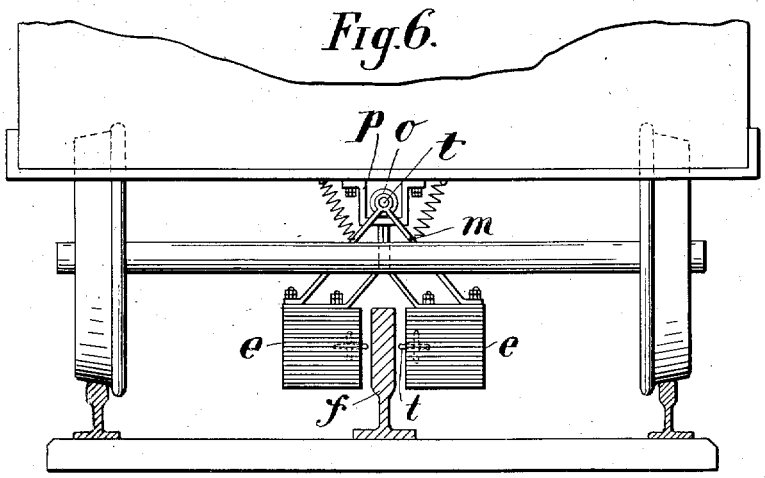
Figure 7:
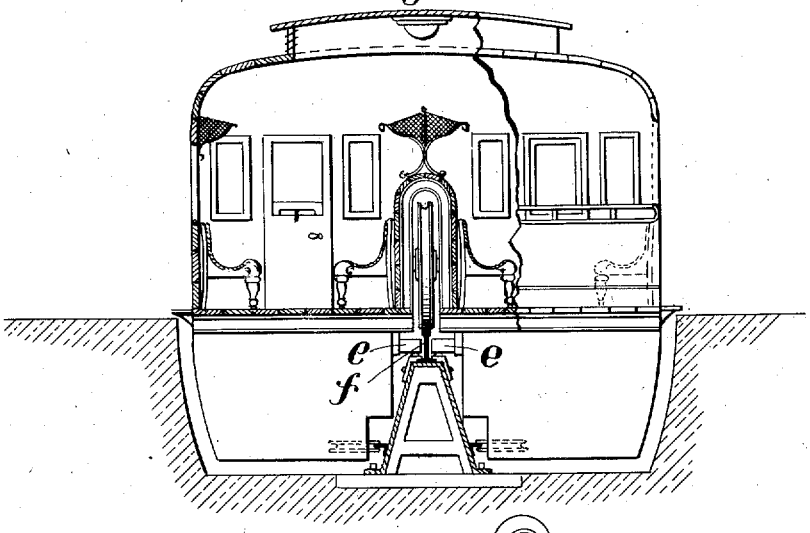
Figure 8:
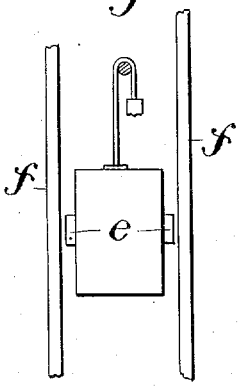
Figure 9:
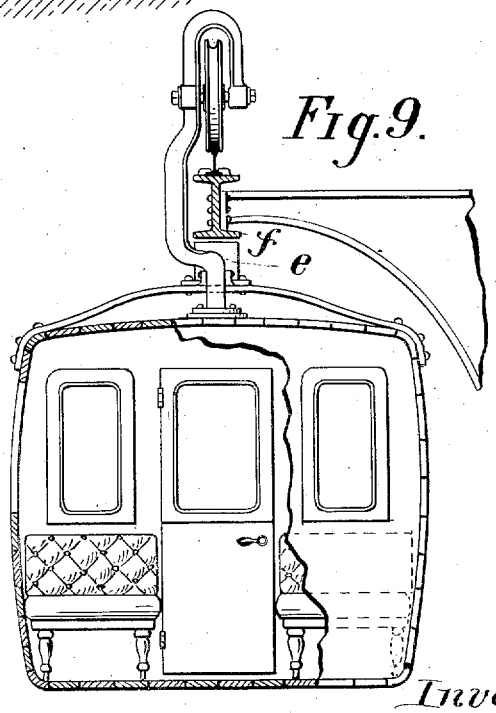
Figure 10:
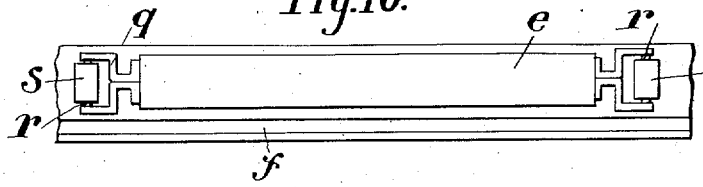
Figure 11:
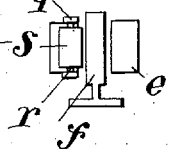
Figure 12:
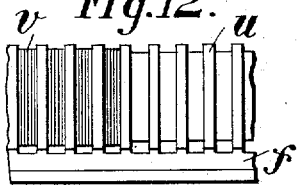
Figure 14:
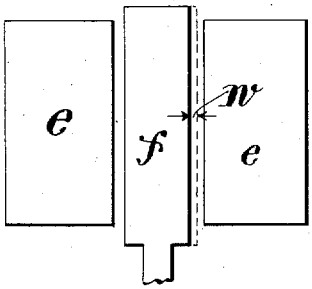
Figure 13:
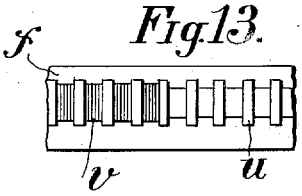
Figure 15:
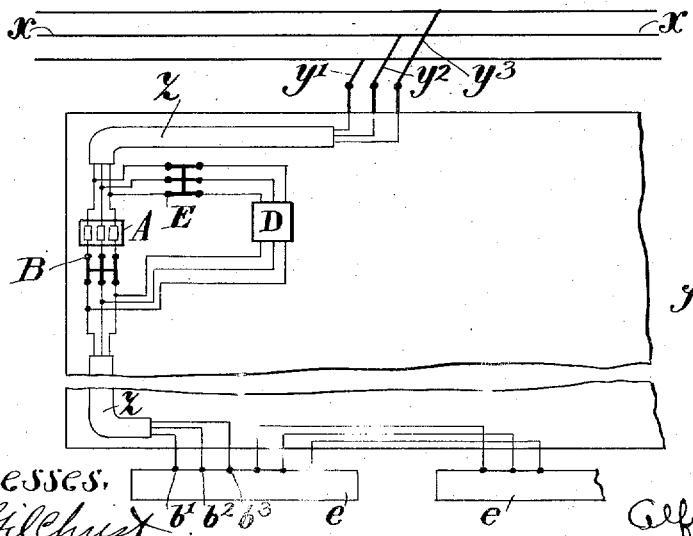
Figure 16:
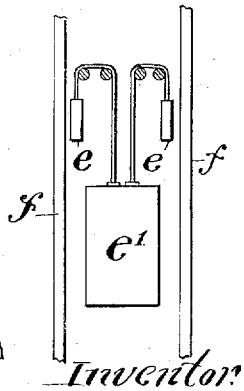

Figure 1 of the accompanying drawings is a diagram illustrating a simple apparatus in which is exemplified the fundamental idea underlying the invention. Fig. 2 illustrates a modification. Fig. 3 is a view taken at right angles to Fig. 2. Fig. 4 shows a further modification. Fig. 5 is an elevation of the induced part shown in Fig. 4. Fig. 6 is a sectional view showing the inducing and induced parts shown in Fig. 4. Figs. 7, 8 and 9 show third, fourth and fifth modifications. Fig. 10 is a side elevation of a traveling field magnet, together with its rail-like armature. Fig. 11 is a front or end view of such magnet and armature. Figs. 12 and 13 show a partially wound rail respectively from the side and top. Fig. 14 shows the rail, the magnet, the magnet-balancing device and the rail between them; and Fig. 15 is a diagram of the electrical connections. Fig. 16 illustrates the application of the invention to an elevator.

The example illustrates the conversion of three phase rotary field motors into polyphase motors having traveling fields and, with the exception of that shown in Fig. 8, in relation to their use in electric railway propulsion, but it must be understood that the invention would embrace the use of single phase and polyphase motors that can be similarly converted into motors having traveling fields, whether employed for railway traction or for other motive purposes for example, for actuating cranes, differential pulleys, lifts, and the reciprocating parts of machine tools. In such a polyphase motor having the magnetically reacting parts of infinite length, a section of the same might comprise a laminated body of iron with triphase windings thereon and an armature of any desired length located thereunder. Such a device is illustrated in Fig. 1, in which the laminated magnet body *e* with the triphase winding *a*, *b*, *c*, is located at a certain distance (indicated by lines and arrows at *d*) above the armature, which, to form an equivalent to the copper windings and iron core of a "short circuit armature", may comprise a brass strip *g* and an iron strip *f*. The triphase windings when excited produce three magnetic effects that combine to produce one resultant field whose maximum and zero values in the magnetic mass alternate at a rate corresponding to the periodicity of the current supplied, so that a traveling field is produced whose rate of progress is the product of the pole length and the periodicity of the current. By reason of the traveling of the field, currents are induced in the armature, and there is thus produced a mutual reaction resulting in a force tending to move the armature in the direction shown by arrow *i*, or by reversing two phases of current, in the direction of the arrow *k*. If, as this invention provides, such a magnet *e* (having its winding connected in parallel in series, or in groups), be suspended under any vehicle, as for instance a railway carriage, and for use over a continuous fixed armature, then such a vehicle possesses in contradistinction to other power-operated vehicle the advantage that a certain part of the weight sometimes added to produce adhesion or stability may be dispensed with as there exists between the magnet and the armature a strong force of attraction, which is equal to a stopping or overloading of the vehicle. When it is desired to prevent this one-sided attraction between the magnet and the armature, a construction according to this invention is adopted in which an armature strip is preferably placed edge upwards, and this arrangement obviates the costly provision of both non-magnetic and a magnetic armature rail, there being used either a single rail of non-magnetic material such as brass, or of magnetic material, for example, steel or iron.

When a non-magnetic armature rail is used there is adapted to move along one side thereof a magnet, and along the other side a mass of laminated iron which is rigidly connected to the magnet and provides magnetic conduction for the lines of force from the magnet. The non-magnetic rail *g* (Figs. 2 and 3) is thus located in the middle and between the laminated poles *e* of the magnet and the laminated iron mass *f*, both of which, by means of insulating stays *h*, may be fixed beneath the body of a vehicle, or on the frame thereof, being also maintained thereby at the desired distance apart.

When a magnetic armature rail is used, a magnet is disposed at each side of the rail (Figs. 4 and 6), the rail *f* of solid iron being located between two laminated magnets *e*. The shape of the magnets and the way in which they are wound may therefore be of varied descriptions, as in polyphase current dynamo machines; it will, for instance, be seen that while in the example illustrated in Fig. 1 each phase winding fills up two grooves, the winding according to Fig. 4 is distributed over three grooves. The construction of the rail forming the short circuit armature can also be very varied; an advantageous form is made with regular punched holes (Fig. 5), and corresponds to the grid type of armature. A great saving in weight and a satisfactory utilization of the induced currents is hereby obtained because these currents cannot then proceed in an improper short circuit. The reduction of cross section must be made only to such an extent that the rail between stopping places has not less than the conduction corresponding to the calculated minimum; at the starting places on the contrary, the holes will be made broader so that the resistance of the longitudinal unit is greater there than between stopping places, and hence starting can be effected with less consumption of current.

For strengthening the induced currents the armature rail may, for instance on sharp upward gradients, be provided with a short circuit winding.

Figs. 12 and 13 show a partially wound rail respectively from the side and top. In case the windings protruded beyond the plane of the armature, the distance between the pole and the rail would of necessity be made correspondingly greater, and in such case the motor would operate at a proportionate disadvantage for the whole of the exposed (not wound) portion of the stretch. For this reason the windings *v*, as shown in these figures, are located in vertically arranged grooves in the armature *f*, so that when uncovered this appears provided with ribs *u*. The cross section of the winding wire, and also the method of winding, whether the individual coils are short-circuited or switched in partly in series, is regulated in any special case by the necessary electrical resistance.

Both in the modification according to Fig. 2 and in that according to Fig. 4 some device may be necessary to prevent mechanical contact between the armature rail and the magnet during lateral oscillations of a vehicle upon which the magnet may be mounted. For this purpose the magnet may according to this invention be suspended in such a way that movement of the magnet at right angles to the direction of the rails can take place; this may be effected, for instance, by rods *m* carrying the magnet and supported by an axis *o* contained in a guide frame *p* so as to have some play for lateral movement (Fig. 6) there being in one or more of the pole pieces of each magnet a small guide wheel *l* which projects slightly, but ordinarily does not come into contact with the rail, although upon considerable lateral oscillations of the vehicle it may do so and prevent the magnet poles from striking against the rail. In Fig. 10 is shown a traveling field magnet, guided in this manner, as seen from the side, and in Fig. 11 as seen from the front. The magnet-pole *e*, which is laterally-shiftable owing to the hanger *m* by which it is carried, supports by means of a forked hanger *q* a roller *s*, rotating upon its axis *r*, a short distance removed from the armature *f*. Upon sidewise swinging of the car, these rollers prevent contact of the rail with the poles, in the same manner as the small wheels *l* in Fig. 4. For convenience, at the right-hand side of Fig. 11 the roller *s*, with its carrier *q* is removed, and the pole is therefore there seen in full. Instead of the small wheel a roller or a bell-shaped guide fixed to an external face of the magnet can be used. Instead of arranging the magnet in this or in a similar manner so as to be movable, it can be simply suspended like a pendulum in order to obtain a similar effect. This idea is likewise illustrated in Fig. 6, already described, only *o* is now constructed as a bearing, in which the shaft *t* rests. From this the hanger *m* is carried, and is movable thereon, and again carries the poles *e*. The poles hang pendent under the carriage, and are themselves, by means of the separating or guide-rollers *l* retained, even under a strong sidewise swinging of the car, at a definite distance from the rail *f*.

This invention is particularly applicable to the propulsion of railway vehicles on the mono-rail system, because the track can be constructed in such a way that the carrying rail also forms the armature for the traveling field motor. The cost of an extra armature rail is thus saved. In such a railway plant there are usually provided guides to prevent too great lateral motion of the vehicle so that the means hereinbefore described for maintaining a sufficient distance between the magnet poles and the railway in some cases may be dispensed with. There exists, as stated in detail in the beginning of the specification, between pole and rail a strong attractive magnetic power, which operates injuriously, and which is overcome through the arrangement of two poles, at the same distance, at both sides of the rail. As the right-hand pole *e* has the effect to draw the car to the left, and the left, in return, to the right, both attractive forces are neutralized. In case, on the other hand, the rail *f* is, at the point *w*, nearer than the left, the magnetic forces are not both neutralized, but an attractive force to the left results: Assuming that *f* (Fig. 14) shows a section of a rail in a curve toward the left, the car and the pole, as a result of the so-called centrifugal force, will move tangentially, that is to say, in relation to the rail, toward the right, which will be resisted by the magnetic attraction to the left. The faster the car travels, so much the more current does it consume, so that, as the centrifugal force is as the square of the speed, and the magnetic attraction as the square of the current, it is possible to uniformly balance the centrifugal force, at all speeds, either in a definite part, or completely, by means of the magnetic power. Fig. 14 shows two methods by which this may be accomplished,—either that the rail, on the curve, is not laid exactly between both poles, but is laid a short distance nearer the outer pole, or that the outer side of the rail is thickened by a piece *w*. The carrying rail *f* (Fig. 7), along both sides of which the magnets *e* move, can be reinforced upon the outer side of the curve so as to obtain a magnetic attraction that will tend to counteract centrifugal force and that to a greater extent the more energy is being spent upon the propulsion of the train.

Instead of locating magnet poles on both sides of an armature rail, the one sided magnetic stress can also be obviated by using a magnet or magnets having poles facing in opposite directions towards two armature rails, as shown diagrammatically in Fig. 8 in the case of a lift, so that each of the two magnets *e* will act inductively upon one of the rails *f*. The magnets need not be attached to the lift cage directly but might be attached to the cables thereof and could in this case conveniently be made of such a size that they would serve as counterweights to the cage; or, since movement of the lift depends upon relative movement between the magnets and the armature of the motor, the armature rail could be fixed to the lift cage or serve as a counterweight or counterweights thereof and the magnets or magnet be stationary.

In several of the arrangements hereinbefore described the invention provides for prevention of one-sided magnetic attraction by using two opposed magnetic forces but in some instances, as when using magnetic attraction to increase adhesion or stability, the effect is rendered useful rather than prejudicial. Another manner of utilizing such unbalanced magnetism is the reverse of that just referred to and provides that the magnetic effect counteracts instead of assists gravity and hence reduces the effective weight of the load to be carried. This device can be used for instance on railways of the so-called suspension type, by utilizing the I-girder *f* (Fig. 9) carried by the main supports of the railway as the armature; in this case, the under surface and not the side of the rails serves as the induction face and for this reason is made of appropriately large dimensions. The magnets *e* are fixed to the vehicle top directly under the girder, and, as soon as a polyphase alternating current is caused to pass through its windings, it produces induced magnetism in the girder and accordingly reduces the effective weight of the vehicle by reason of the supporting magnetic attraction. A guide for preventing contact between the magnet poles and the armature may be dispensed with in this arrangement.

The most important peculiarities of the electrical combinations of one of the poles with the conductors is shown in Fig. 15. It is a three-phase current arrangement. From the high-tension conductor X the current is conducted to the car by means of the conducting-wires $y'$, $y^2$, $y^3$; it is in principle the same, whether the feed wires are subterranean, or above the car, or at the side of the same. Within the car the conduction may be carried out by a cable Z. In the circuit, according to Fig. 15, are arranged a three-pole high-tension safety-fuse A and a three pole high-tension cut-out switch B. The poles are secured to the cable Z by means of clamps $b'$, $b^2$, $b^3$, so that the poles have no movable parts. Their winding in Fig. 15 is according to the scheme of Fig. 4, as this serves for series winding. It is usually not necessary to switch a starter into the circuit, as the alteration of resistance necessary in the second circuit for starting, is obtained by the increased openings of the armature-rail, at the stations, as mentioned earlier in the text. The starting is accomplished in the simplest manner, by closing of the main switch. For the few cases, in which the individual trains of a rapid-transit road must stop between stations, and must necessarily start again, where the armature-resistance is too small, an induction-starter D is carried, which is commonly, by means of the switch E, switched out. When the car must be started in an open stretch, switch B is opened, and E on the contrary closed, until the train, through gradual increase of the pole-potential (tension) with aid of the starter D has almost attained its normal speed. B is then again closed, and E, which thereby becomes almost without current is again switched out. Of course, the induction starter D may be used, at the same time, in the well-known manner, as a transformer and the pole *e* correspondingly serve for low tension.

Having thus described my invention, I claim:

1. The combination of a rail-like armature, a traveling-field magnet, and means for neutralizing the magnetic attraction of the latter, substantially as set forth.

2. The combination of a plurality of rail-like armatures, and a plurality of traveling-field magnets arranged to act thereon in opposite directions, substantially as set forth.

3. The combination of a rail-like armature and an electro-magnet on a carriage, said armature being located relatively to said magnet so that by the coöperation of these parts the carriage is not only moved forward but its weight in whole or in part is counterbalanced, substantially as set forth.

4. The combination of a rail-like armature provided with openings, and a traveling-field magnet arranged in juxtaposition to said armature, substantially as set forth.

5. The combination of a rail-like armature provided with openings of different breadths, a traveling field magnet, and means for neutralizing the magnetic attraction of said magnet, substantially as set forth.

6. The combination of a rail-like armature, a traveling-field magnet movable transversely to said armature, means for neutralizing the magnetic attraction of said magnet, and means for guiding said magnet out of contact with said armature, substantially as set forth.

7. The combination of a rail-like armature, reinforced at its outer sides at curves, a traveling-field magnet, and means for neutralizing the magnetic attraction of said magnet, substantially as set forth.

ALFRED ZEHDEN.

Witnesses:
HEINRICH MOELLER,
JACOB HUBERT MOHR.